United States Patent
Erlichman

[15] 3,699,865
[45] Oct. 24, 1972

[54] SELF-DEVELOPING REFLEX CAMERA

[72] Inventor: Irving Erlichman, Wayland, Mass.

[73] Assignee: Polaroid Corporation, Cambridge, Mass.

[22] Filed: Aug. 26, 1970

[21] Appl. No.: 67,051

[52] U.S. Cl. .................................. 95/42, 95/13
[51] Int. Cl. ............................. G03b 19/12
[58] Field of Search ......................... 95/42, 13

[56] References Cited

UNITED STATES PATENTS

| | | | |
|---|---|---|---|
| 3,442,192 | 5/1969 | Sato | 95/42 |
| 3,391,626 | 7/1968 | Ettischer | 95/42 |
| 3,468,232 | 9/1969 | Knapp | 95/42 |
| 3,532,044 | 10/1970 | Shimomura | 95/42 |
| 3,540,365 | 11/1970 | Ishizaka | 95/42 |
| 3,545,357 | 12/1970 | Erlichman | 95/13 |

*Primary Examiner*—Samuel S. Matthews
*Assistant Examiner*—Michael Harris
*Attorney*—Brown and Mikulka, Alfred E. Corrigan and Lawrence G. Norris

[57] ABSTRACT

The energy absorbed in decelerating a reflecting member as it reaches the end of its travel is used to perform some useful function associated with the processing of a film unit. The camera includes a support for locating a film unit in position for exposure and film advancing apparatus for engaging and moving a film unit, subsequent to exposure, from its exposure position into the bite of a pair of rolls for subsequent movement to the exterior of the camera. The camera further includes a reflecting member which is mounted for movement between a first position in which it directs an image toward the film unit located in position for exposure and a second position in which it functions as a component of the camera's viewing system. A plurality of links and gear's are coupled between the reflecting member and the film advancing apparatus for transferring a portion of the kinetic energy of the moving reflecting member to the film advancing apparatus to move the film unit toward the rolls as the reflecting member moves between the first and second positions.

11 Claims, 5 Drawing Figures

INVENTOR.
IRVING ERLICHMAN

BY Brown and Mikulka
and
Alfred E. Corrigan
ATTORNEYS

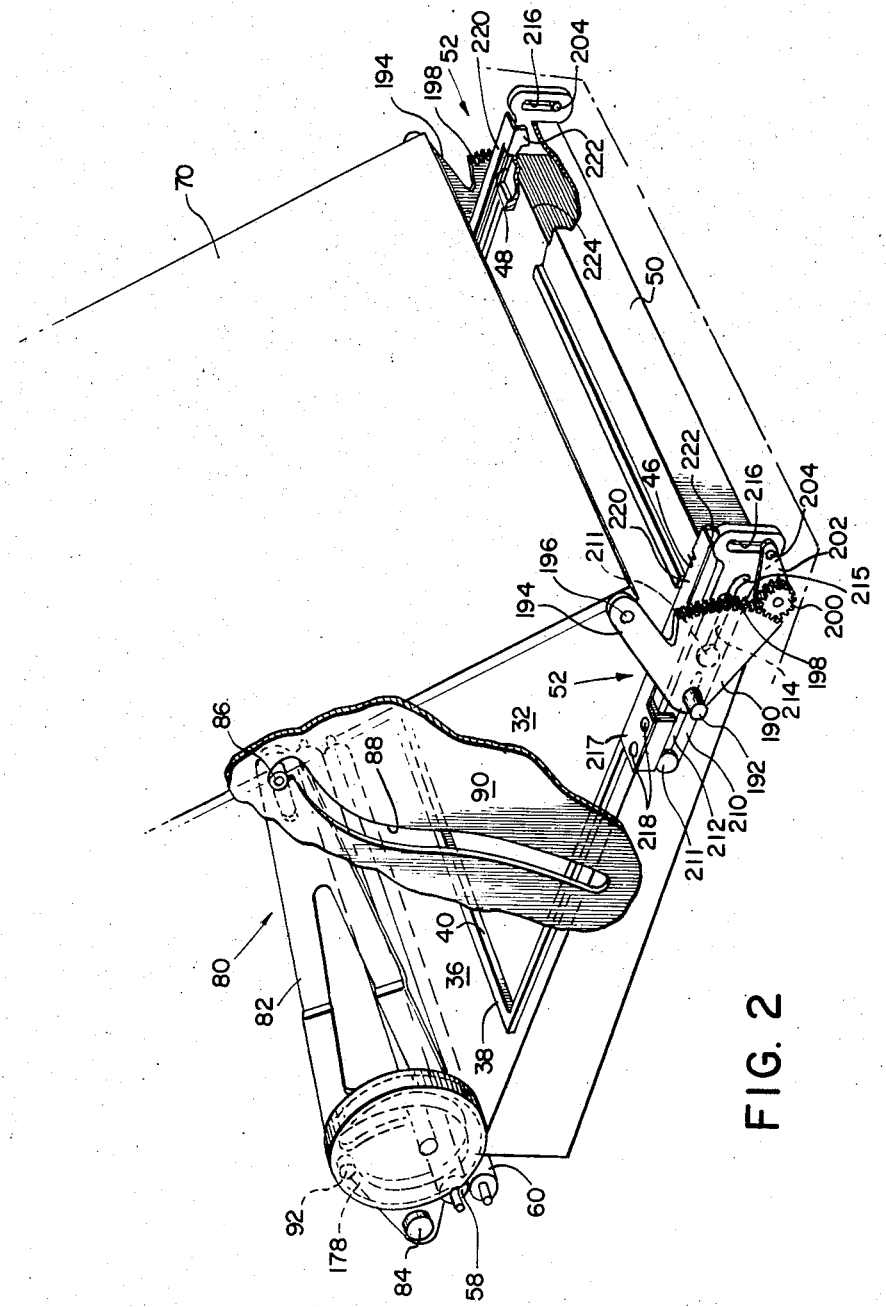

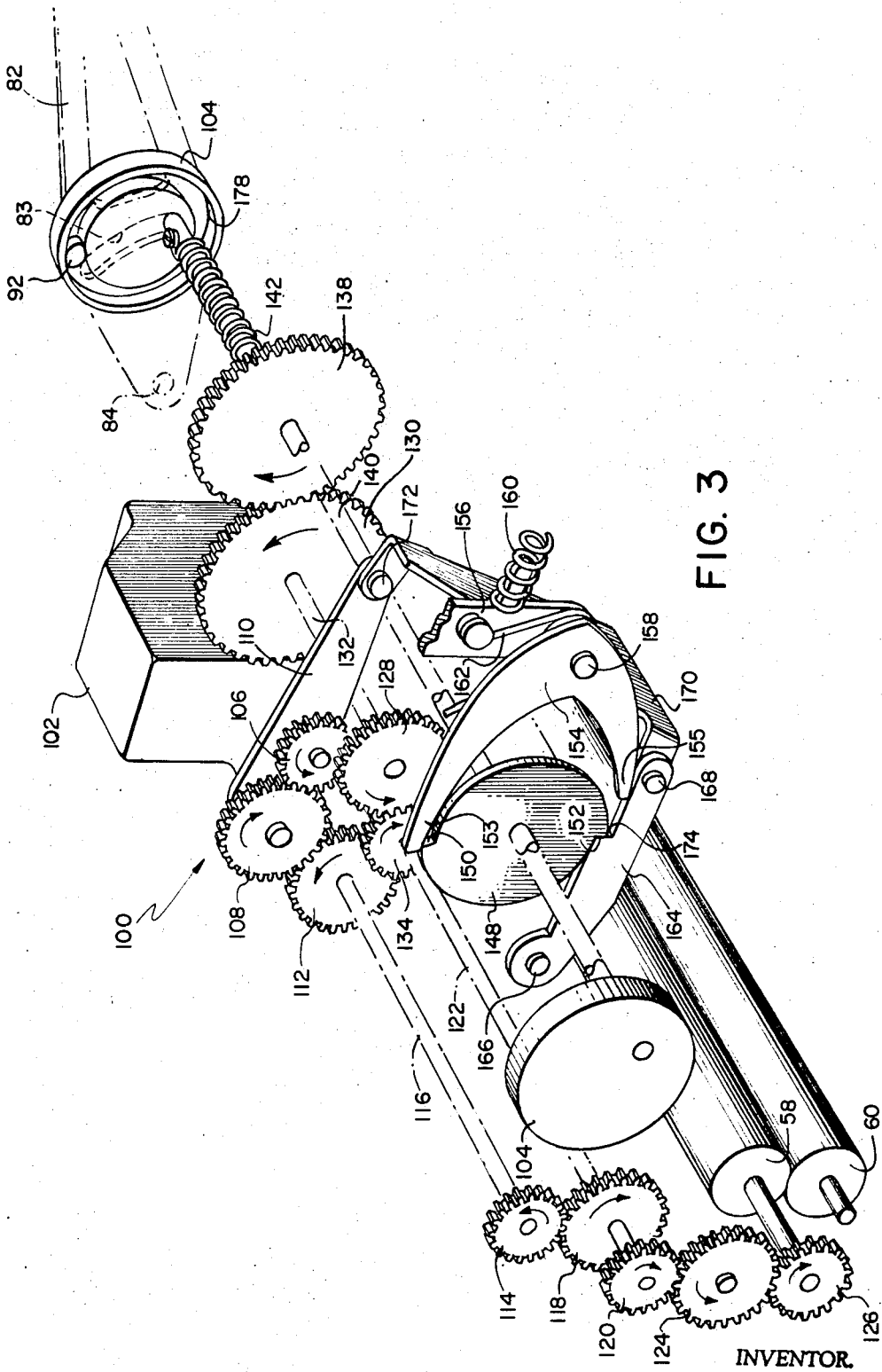

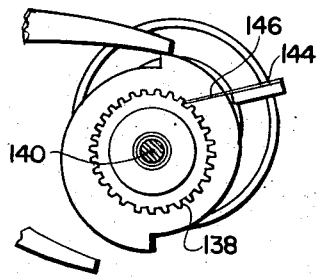
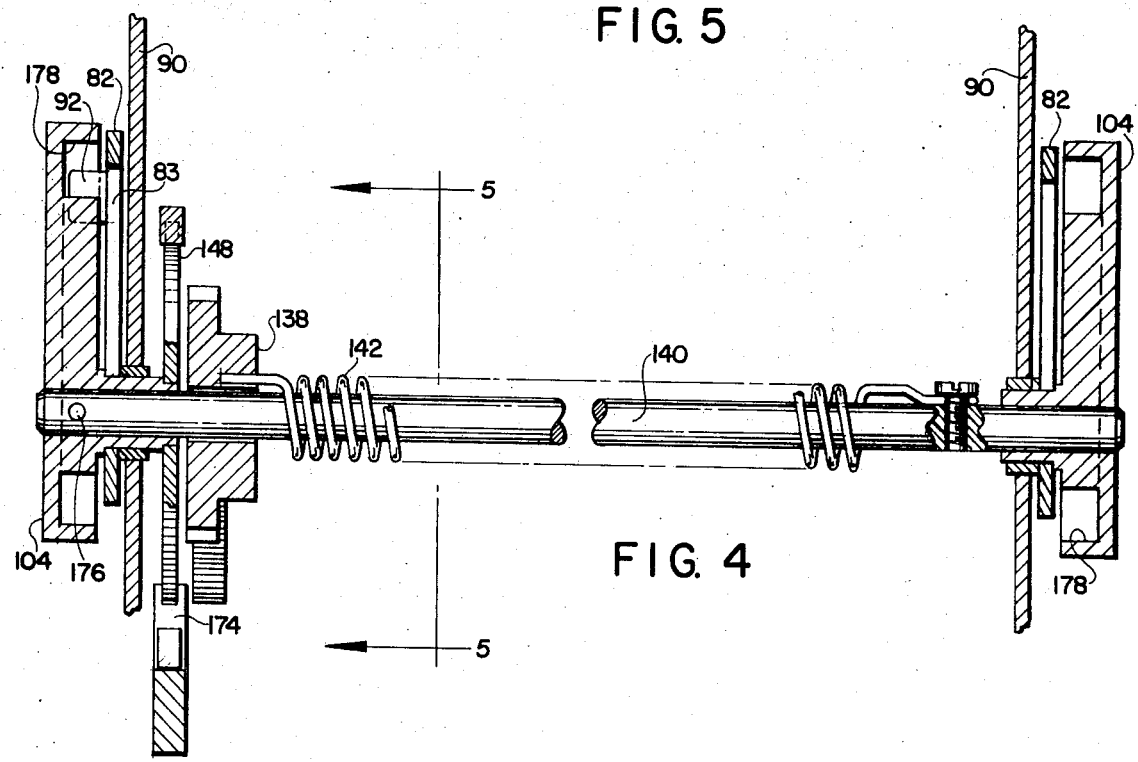
FIG. 5
FIG. 4
INVENTOR.
IRVING ERLICHMAN
ATTORNEYS

SELF-DEVELOPING REFLEX CAMERA

BACKGROUND OF THE INVENTION

1. Field of the Invention

This invention relates to photographic apparatus, e.g., cameras, of the type adapted to expose and process individual film units and, more particularly, to a single lens reflex camera including a reflecting member mounted for movement between a first position in which it functions as a component of the camera's exposure system and a second position in which it functions as a component of the camera's viewing system, and film advancing apparatus for engaging and advancing a film unit, subsequent to exposure, from its exposure position into the bite of a pair of rolls as the reflecting member moves between the aforementioned first and second positions.

One of the problems associated with reflex cameras is the time between actuation of the camera's shutter release button and the exposure of the film unit located in position for exposure. During this time delay the user of the camera must hold the camera relatively steady until the camera's shutter is closed, the viewfinder and/or rangefinder are conditioned to prevent the entry of actinic light into the interior of the camera, the reflex mirror or reflecting member has moved to a position which will allow exposure of the film unit and the camera's shutter opened and closed to allow the exposure. This time delay may be decreased by increasing the speed at which the reflex mirror is moved out of its reflex position and into a position wherein it no longer functions as a component of the camera's viewing and ranging systems. This may be accomplished by preloading a spring drive for rapidly moving the reflex member between the reflex and exposure positions rather than employing a conventional motor operated drive wherein the motor has to overcome its own inertia and that of components connected thereto before it can drive the reflex member between the aforementioned positions. However, increasing the speed at which the reflex member moves can result in additional problems, i.e., a jerking of the camera caused by the impact as the reflex member comes to a sudden stop at the end of its travel and just prior to exposing the film unit, and possible damage to the reflex member.

2. Description of the Prior Art

Various solutions have been proposed to eliminate the aforementioned problems. Complicated and expensive erecting systems were tried along with damping systems for decelerating the speed of the reflex member as it approached the terminal ends of its travel. However, although each of these systems may have had some degree of success in solving the problems, they all have a common failing, i.e., they are basically impact absorption systems in which the kinetic energy of the moving reflex member is merely dissipated.

SUMMARY OF THE INVENTION

The invention includes a camera of the single lens reflex type including a reflecting member having opposed reflecting surfaces. The reflecting member is mounted for movement between a first position in which the reflecting member is part of the camera's exposure system and a second position in which it is part of the camera's viewing system. Coupled to the reflecting member is film advancing apparatus which is actuated by the reflecting member as it moves between the first and second positions to engage and move a film unit from its exposure position into the bite of a pair of rolls. The coupling between the film advancing apparatus and the reflecting member is such that the film advancing apparatus is actuated to move a film unit toward a pair of rolls as the reflecting member approaches the second position. In other words, the speed of the reflecting member is decreased as it approaches the terminal end of its travel between the first and second positions by transferring part of its energy to some means for performing a useful function associated with the processing of a film unit, e.g., cocking a shutter, operating a film advancing apparatus or the rolls.

Accordingly, it is an object of the invention to provide in a camera of the reflex type including a reflex member mounted for movement between first and second positions and means for driving the reflex member between said first and second positions, mean for absorbing a portion of the kinetic energy of the reflex member as it approaches said second position, the absorbed energy being utilized to operate at least one component of the camera associated with the processing of a film unit.

Another object of the invention is to provide in a camera of the type including means for locating a film unit in position for exposure and reflecting means mounted for movement between reflex and exposure positions, means responsive to movement of the reflecting means between the exposure and reflex positions for moving a film unit out of the exposure position.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein:

FIG. 2 is a perspective view, partly in section, of a portion of the interior of a camera to which the instant invention pertains;

FIG. 3 is a perspective view of a gear train utilized in the camera of FIGS. 1 and 2;

FIG. 4 is an enlarged elevational view, partly in section, of a spring drive for the camera's reflex member; and FIG. 5 is a view taken along the line 5—5 of FIG. 4.

DETAILED DESCRIPTION OF THE INVENTION

Figure 1:
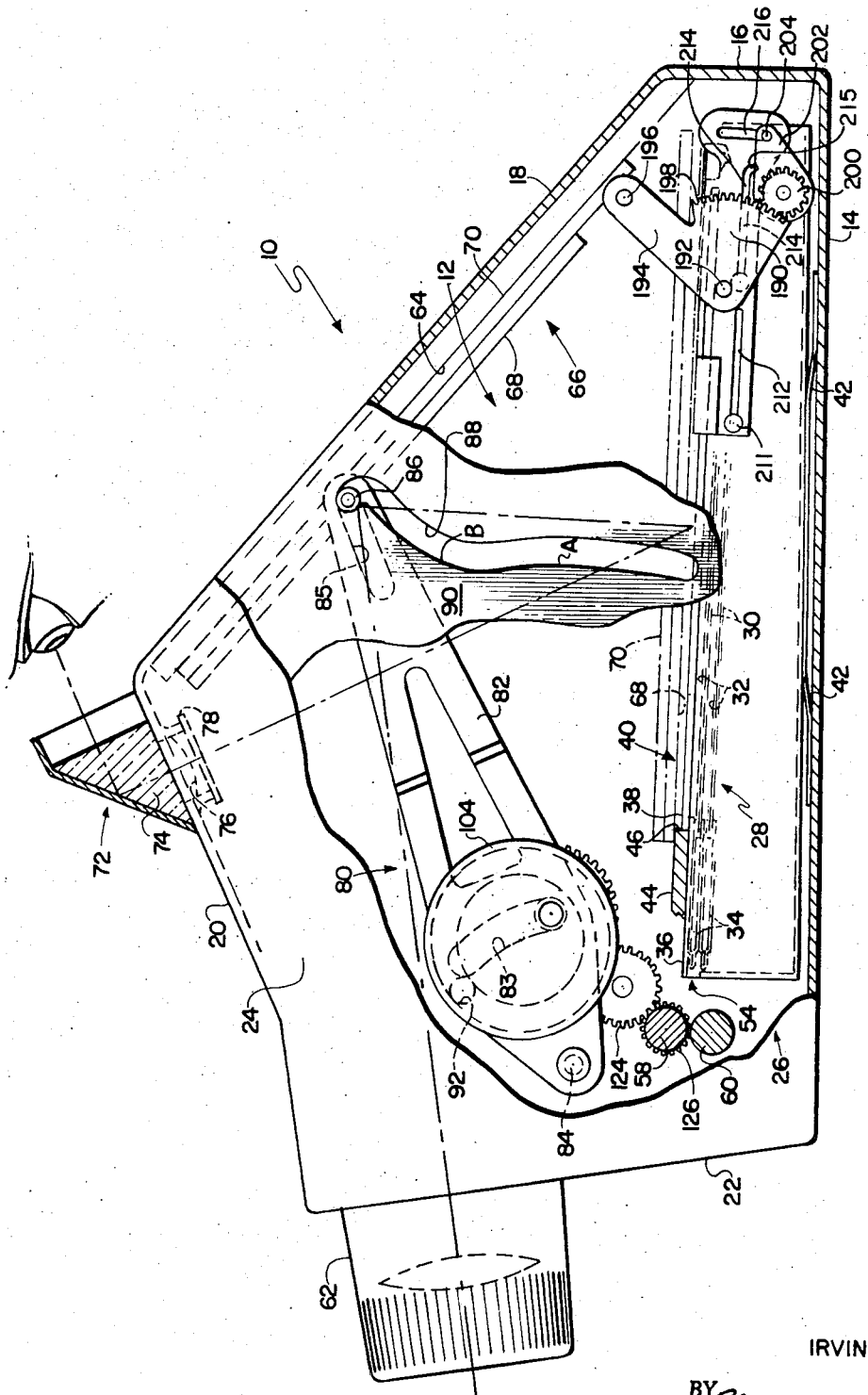
FIG. 1 is an elevational view, partly in section, of a camera embodying the instant invention.

Reference is now made to FIG. 1 of the drawings wherein is shown photographic apparatus in the form of a camera 10 of the self-developing, single lens reflex type. Camera 10 includes a chamber 12 defined by side walls 14, 16, 18, 20 and 22 and end walls 24 (only one of which is shown). Positioned within chamber 12 is a film container 26 which houses a plurality of individual film units 28 (only two of which are shown) of the type shown in U. S. Pat. No. 3,415,644 granted on Dec. 10, 1969 to E. H. Land and assigned to the same assignee as the instant application. Each film unit 28 includes a photosensitive sheet 30, a superposed transparent, image-receiving sheet 32 and a rupturable pod 34 containing a processing material which is adapted to be evenly spread between sheets 30 and 32 to initiate a diffusion transfer process. A forward wall 36 of the film container is provided with a rib 38 which defines a generally rectangular exposure aperture 40 through which light is admitted to expose the forwardmost film unit. Means such as springs 42 and a plate-like member 44 having an aperture 46 therein for receiving rib 38 are provided for correctly supporting and positioning the forwardmost film unit in position for exposure. A pair of laterally spaced, elongated slots 46 and 48 (see FIG. 2) are provided in forward wall 36 and extend part way down trailing end wall 50 for receiving film advancing apparatus 52 which is adapted to move the forwardmost film unit 28, subsequent to exposure, through an opening 54 in the leading end wall 56 of the film container and into the bite of a pair of rolls 58 and 60 as will be more fully explained hereinafter.

The camera's ranging and viewing systems include an adjustable focus lens and shutter assembly 62 mounted in wall 22; a mirror 64 mounted on an interior surface of wall 18; a pivotally mounted reflex or reflecting member 66 having a reflecting surface 68 on one side and a Fresnel-type mirror 70 on the opposite side and a pin 86 at each lateral side thereof; and a viewer 72 including a prism 74 and a lens 76. A closure member indicated diagrammatically at 78 is mounted adjacent lens 76 and is adapted to be moved to a position covering the lens 76 to prevent the passage of light therethrough when the shutter is being actuated to expose the forwardmost film unit 28.

Reflex member 66 is adapted for movement between a first position in which reflecting surface 68 receives light admitted by the lens and shutter 62 and directs it toward the film unit 28 located in position for exposure (as shown in FIG. 1) and a second position wherein the reflex member 66 is pivoted downwardly, as viewed in FIG. 1, to a position in lighttight engagement with plate-like member 44 and the Fresnel-type mirror 70 is parallel with and closely adjacent the plane containing the forwardmost film unit. In this second position, the Fresnel-type mirror 70 is a component of the camera's viewing system, i.e., light from the subject passes through the lens and shutter assembly 62 (which is maintained in an open condition during ranging and viewing) and is reflected onto the Fresnel-type mirror 70 by mirror 64. Mirror 70 in turn redirects this light through lens 76 (which at this time is uncovered) and prism 74.

The means for moving reflex member 66 between the first and second positions include an erecting system 80 having a link 82 pivotally connected to the camera structure at 84. Link 82 includes a first slot 83 which is adapted to provide clearance for a drive shaft as will be explained shortly, a second slot 85 which is adapted to slideably receive pin 86 mounted on the lateral side of reflex member 66, and a cam follower 92. A similar erecting system (not shown) is provided for the other side of the reflex member.

The energy for moving the reflex member 66 is derived from a drive system 100 shown in FIG. 3. Drive system 100 includes a motor 102, which may be run by a battery located in film container 26 or may be a manual spring wound motor, connected to a pair of laterally spaced cams 104 by a plurality of gears. More specifically, the gear train between the motor 102 and the cams 104 include a drive gear 106 and an idler gear 108 in mesh with each other, gear 108 being mounted on a link 110 which is pivotally mounted about the axis of drive gear 106. Idler gear 108 is in engagement with a first gear reduction train including gears 112 and 114 mounted on shaft 116. Gear 114 is in engagement with a second gear reduction train including gears 118 and 120 mounted on shaft 122. Gear 120 is drivingly engaged with an idler gear 124 which in turn is in mesh with drive gear 126 located on the end of roll 58. A third gear reduction train including gears 128 and 130 and shaft 132 is coupled with gears 118 and 120 by gear 134 mounted on shaft 122. Gear 130 is in mesh with a spring windup gear 138. Gear 138 is rotatably mounted about shaft 140 and a spring 142 is suitably connected between the two such that counterclockwise rotation of gear 138 (as viewed in FIG. 3) will result in energy being stored in spring 142 due to the spring being wound up. Suitable means such as a member 144 (see FIG. 5) having a resilient stop 146 mounted thereon may be provided to prevent the woundup or tensioned spring 142 from driving gear 138.

Also mounted on shaft 140 is a ratchet-like member 148 having substantially diametrically opposed teeth 150 and 152. A pawl 154, pivotally mounted to a link 156 by a pin 158, is positioned adjacent ratchet-like member 148 to assist in the control of the rotation thereof. Link 156 has its other end (not shown) pivotally attached to the camera structure. A spring 160 is coupled between the link 156 and the camera structure for absorbing forces transmitted thereto by the pawl 154 as it stops rotation of the ratchet-like member 148. A second spring 162 is coupled between the pawl 154 and the link 156 for resiliently urging pawl 154 in a counterclockwise manner (as viewed in FIG. 3).

A second pawl 164 is pivotally mounted at one end to the camera structure about a pin 166 and is resiliently biased in a counterclockwise direction by suitable means (not shown). The other end of pawl 164 is pivotally connected at pin 168 to a rigid member 170 which in turn is pivotally connected to one end of link 110 by a pin 172. Pawl 164 further includes a stop 174 which is adapted to engage either tooth 150 or 152 to stop rotation of ratchet-like member 148. Finally, as can be seen in FIG. 4, cams 104 are fixedly attached to the ends of shaft 140 by pins 176 (only one of which is shown) and are eccentrically mounted with respect to the axis of shaft 140. Each cam 104 includes a cam track 178 which is adapted to receive and retain cam follower 92 mounted on link 82.

The camera is also provided with means responsive to movement of the reflex or reflecting member 66 between the aforementioned first and second positions for actuating the film advancing apparatus 52. As shown in FIGS. 1 and 2 the aforementioned means includes a sector gear 190 pivotally mounted to the camera structure by a pin 192. Sector gear 190 includes an arm 194 pivotally coupled to reflex member 66 at 196, and gear teeth 198. Teeth 198 are continuously in mesh with a second gear 200 which is also rotatably supported by camera structure (not shown). A link 202 having a pin 204 at one end thereof is attached to gear 200 for rotational movement therewith. A similar arrangement of parts is provided on the laterally opposite side of the camera.

Film advancing apparatus 52 includes a generally L-shaped member 210 suitably supported by a pair of pins 211 attached to the camera and having pair of horizontally disposed slots 212 and 214 which receive the pins 211, and a generally vertically disposed slot 216 which is adapted to receive pin 204. A film engaging means 217 is attached to L-shaped member 210 by rivets 218. Film engaging means 217 includes an elongated arm 220 which terminates in a downwardly projecting film engaging member 222. As can be seen in FIG. 2, members 222 are spaced slightly to the rear of the trailing end 224 of a film unit 28 when the reflex member 66 is in the exposure position, i.e., the aforementioned first position.

In operation, the operator of the camera views the subject through the viewing port 72. At this time the shutter 62 is open, closure member 78 is out of alignment with lens 76, and reflex member 66 is in the second position, i.e., in a position overlying frame member 44 as shown in broken lines in FIG. 1. The image of the subject is transmitted through the camera's lens and onto mirror 64 which redirects the image onto the Fresnel-type mirror 70. Mirror 70, in turn, redirects the image toward lens 76 and prism 74. After the image has been correctly focused by any suitable focusing means (not shown), the shutter button is actuated to initiate the camera's exposure cycle. During the exposure cycle, the shutter 62 and closure member 78 are closed to prevent entry of actinic light into chamber 12. Actuation of the camera's shutter also momentarily reverses the voltage to motor 102 to drive gear 106 in a clockwise direction as viewed in FIG. 3. Clockwise rotation of gear 106 causes gear 108 to move in a direction away from gear 112, i.e., because of the relative position of the axes of gears 106, 108 and 112, gear 108 will rotate in a counterclockwise direction about its own axis and simultaneously rotate in a clockwise direction about the axis of gear 106. As gear 108 moves in a clockwise direction, it will rotate link 110, to which it is attached, in a similar direction thereby moving member 170 and pawl 164 in a clockwise manner about the axis of pin 166. As pawl 164 moves in a clockwise manner about the axis of pin 166, stop 174 moves out of engagement with tooth 152 on ratchet-like member 148 to allow the latter to rotate in a clockwise direction through an angle of approximately 170° (spring 142 being under tension at this time). As soon as stop 174 has been moved to a position out of engagement with tooth 152, the circuit to motor 102 is opened and suitable spring means (not shown) urge pawl 164 to its original position. As ratchet-like member 148 rotates in a clockwise direction, spring 162 is urging arm 153 of pawl 154 into a position wherein it will strike tooth 152 when it has traveled approximately through an angle of 170°. However, arm 153 only stops the rotation of ratchet-like member 148 for a moment because pawl 164, which is spring biased into the position shown in FIG. 3, is now moving upwardly to pivot arm 155 of pawl 154 in a direction which moves arm 153 out of engagement with tooth 152. The tooth 152 then rotates through an angle of approximately 10° before stop 174 on pawl 164 arrests the rotation of the ratchet-like member 148. Pawl 154 thus ensures that the degree of rotation is limited to one-half revolution regardless of how long it takes stop 174 to get back into its locking position.

This latter rotation of ratchet-like member 148 drives cams 104 in a similar direction. As cams 104 rotate in a clockwise direction, cam followers 92 move in a counterclockwise direction to move links 82 and reflex member 66 to the position shown in FIG. 1. At the time that reflex member 66 starts its movement from the second position, i.e., the position shown in broken lines in FIG., 1, toward the first position, i.e., the position of reflex member 66 shown in solid lines, the film advancing apparatus is located substantially in its forwardmost position (to the left as viewed in FIG. 1). As reflex member 66 moves upwardly, pin 86, attached to reflex member 66, rides against that surface of slot 88 designated A which is a radius of axis 84. This movement of pin 86 results in a compound movement of the reflex member about the axes of pins 192 and 196. In other words, sector gear 190 is rotated in a counterclockwise direction about the axis of pin 192 while reflex member 66 rotates in a clockwise direction about the axis of pin 196. As sector gear 190 is rotated in a counterclockwise direction, it moves pin 204 downwardly in slot 216 to move arm 220 and film engaging member 222 to the right as viewed in FIG. 2. As the reflex member continues its upward movement, pin 86 leaves the portion of slot 88 designated as A and rides on that portion of the slot designated as B, which is a radius of axis 196. The movement of pin 86 along radius B results in reflex member 66 continuing its clockwise rotation about pin 196 without imparting any movement to sector gear 190. Finally, as pin 86 approaches the top of slot 88, cam track 178 cooperates with pin 86 to rapidly decelerate reflex member 66 while pin 86 reverses its direction to cause further counterclockwise rotation of sector gear 190 to move film engaging member 222 to its rearwardmost position.

When the reflex member 66 reaches its fully up position, it actuates a switch to allow the opening blade of the shutter to move to a position which allows light to pass through the lens onto mirror 68 from where it is reflected toward the forwardmost film unit 28 to expose the latter. When the correct exposure time has elapsed, the shutter's closing blade is released to shut off the light passing through the lens and shutter assembly 62. The voltage to motor is again reversed to allow ratchet-like member 148 to rotate in a clockwise manner until tooth 150 is back in the position shown in FIG. 3. This second rotation of ratchet-like member 148 again rotates cam 104 to move the reflex member downwardly. Initial downward movement of reflex member 66 moves pin 86 and reflex member 66 to the right as viewed in FIG. 1 thereby causing sector gear 190 to rotate in a clockwise manner. This clockwise movement advances film engaging member 222 from its rearwardly most position to a position in contact with the trailing end of the forwardmost film unit. When pin 86 senses the reacting load caused by the load of the film unit in the box, it will use this as a fulcrum point and take the path of least resistance, i.e., it will move toward surface B while simultaneously moving from the right end of slot 85 toward the left end. The reflex member continues to accelerate downwardly until pin 86 bottoms or seats in the left end of slot 85. During this acceleration, a switch to the motor 102 is automatically closed for a predetermined period of time to drive the gear train of FIG. 3 in the direction shown by the arrows in order to rewind spring 142 and to drive the rolls 58 and 60 until the film unit has been processed. When pin 86 seats in slot 85 further movement of reflex member 66 will cause sector gear 190 to rotate rapidly in a clockwise manner to advance the exposed film unit 28 from the film container 26 via slot 54 into the bite of the rotating rolls 58 and 60. It will be noted that as film advancing apparatus 52 nears the end of its film advancing stroke, pin 211 approaches a downwardly turned end 215 in slot 214. This downwardly turned end 215 enables L-shaped member 210 to rotate in a counterclockwise manner about the axis of pin 211 located in slot 212 thereby moving film engaging member 222 out of engagement with the next film unit in the container. The rolls rupture pod 34 and distribute the processing liquid between the layers 30 and 32 to initiate a diffusion transfer process. Finally the film unit is advanced to the exterior of the camera via an opening (not shown) in wall 22 and the power to the motor discontinued. It can thus be seen that the reflex member is rapidly decelerated near the end of its travel by using part of its kinetic energy to drive the film unit from the film container.

From the foregoing it can be seen that there has been disclosed a novel, useful and highly efficient correlation of structure for rapidly moving a reflex member between an exposure position and a reflex position and in which the reflex member is rapidly decelerated as it approaches the reflex position to reduce the shock to the camera when the reflex member is stopped. The energy given up by the decelerating reflex member is used to perform a useful function in the camera, e.g., to drive a film advancing apparatus. Alternatively, this energy could be used to recock the camera's shutter or help in rotating the camera's processing rolls.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. Photographic apparatus comprising:
   reflecting means mounted within said apparatus;
   means drivingly coupled to said reflecting means for imparting energy to said reflecting means for moving said reflecting means between first and second positions;
   means connected to said apparatus for performing a function associated with the movement of a film unit subsequent to exposure; and
   means connected between said reflecting means and said means for performing a function for transferring a portion of said imparted energy to said means for performing a function as said reflecting means approaches said second position.

2. Photographic apparatus as defined in claim 1 wherein said means for performing a function include means for advancing a film unit from an exposure position subsequent to exposure.

3. Photographic apparatus as defined in claim 2 wherein said means for transferring is adapted to locate said advancing means in position to advance a film unit from said exposure position as said reflecting means is moved from said second position toward said first position.

4. Photographic apparatus as defined in claim 2 wherein said advancing means decelerates the speed of said reflecting means as said reflecting means approaches said second position.

5. Photographic apparatus as defined in claim 4 wherein said reflecting means directs an image toward a film unit located in exposure position when said reflecting means is in said first position.

6. Photographic apparatus as defined in claim 5 wherein said reflecting means directs an image away from said film unit when said reflecting means is in said second position.

7. Photographic apparatus as defined in claim 5 wherein said means for advancing include laterally spaced film engaging means.

8. Photographic apparatus as defined in claim 5 wherein said means for advancing is mounted for reciprocating motion, and said means for transferring is adapted to translate rotary movement of said reflecting means into linear movement of said means for advancing.

9. Photographic apparatus as defined in claim 5 wherein said means for advancing includes film engaging means and means for moving said film engaging means to a position out of engagement with a film unit as said reflecting means approaches said second position.

10. Photographic apparatus as defined in claim 1 wherein said reflecting means is a component of an exposure system when in said first position.

11. Photographic apparatus as defined in claim 10 wherein said reflecting means is a component of a viewing system when in said second position.

* * * * *